(12) United States Patent
Sonoda et al.

(10) Patent No.: US 8,984,337 B2
(45) Date of Patent: Mar. 17, 2015

(54) APPARATUS AND METHOD FOR SELECTING CANDIDATE FOR FAILURE COMPONENT

(75) Inventors: Masataka Sonoda, Kawasaki (JP); Yuji Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 465 days.

(21) Appl. No.: 12/977,583

(22) Filed: Dec. 23, 2010

(65) Prior Publication Data
US 2011/0161740 A1 Jun. 30, 2011

(30) Foreign Application Priority Data
Dec. 28, 2009 (JP) ................................. 2009-298877

(51) Int. Cl.
G06F 11/00 (2006.01)
G06F 11/07 (2006.01)

(52) U.S. Cl.
CPC .................................. *G06F 11/0709* (2013.01)
USPC ........................................................ 714/26

(58) Field of Classification Search
USPC ........................................................ 714/26
See application file for complete search history.

(56) References Cited

U.S. PATENT DOCUMENTS

| | | | |
|---|---|---|---|
| 5,309,448 A | 5/1994 | Bouloutas et al. | |
| 5,483,637 A | 1/1996 | Winokur et al. | |
| 6,243,746 B1 * | 6/2001 | Sondur et al. | 709/220 |
| 6,701,459 B2 * | 3/2004 | Ramanathan et al. | 714/37 |
| 6,732,297 B2 | 5/2004 | Oura | |
| 7,215,360 B2 * | 5/2007 | Gupta | 348/180 |
| 7,509,518 B2 * | 3/2009 | Bailey et al. | 714/1 |
| 7,529,974 B2 * | 5/2009 | Thibaux et al. | 714/26 |
| 7,603,458 B1 * | 10/2009 | Sexton et al. | 709/224 |
| 7,631,222 B2 * | 12/2009 | Hasan et al. | 714/26 |
| 2007/0226540 A1 * | 9/2007 | Konieczny | 714/26 |
| 2008/0256404 A1 | 10/2008 | Funatsu | |
| 2009/0157723 A1 * | 6/2009 | De Peuter et al. | 707/102 |

FOREIGN PATENT DOCUMENTS

| | | |
|---|---|---|
| GB | 2 391 132 | 1/2004 |
| JP | 02-244338 | 9/1990 |
| JP | 06-324904 | 11/1994 |

(Continued)

OTHER PUBLICATIONS

British Office Action for corresponding application GB1021781.8; dated Apr. 20, 2011.

*Primary Examiner* — Philip Guyton
(74) *Attorney, Agent, or Firm* — Staas & Halsey LLP

(57) ABSTRACT

An apparatus for selecting a candidate for a failure component causing errors from a plurality of components included in a network system, the apparatus includes a processor for executing a procedure. The procedure includes determining a relation class of a relation among the plurality of components on the basis of configuration information of the network system, each of the relations being classified into one of the relation classes in accordance with a direction of an error propagation, determining an investigation range for each component having an error on the basis of investigation information including an error type of an error occurred in the each component and an investigation direction corresponding to the relation class, the investigation range being a set of the components to be investigated, and selecting a component on the basis of an appearance frequency of each component in the investigation ranges as the candidate.

5 Claims, 24 Drawing Sheets

(56) References Cited

FOREIGN PATENT DOCUMENTS

| | | |
|---|---|---|
| JP | 2001-222442 | 8/2001 |
| JP | 2007-011823 | 1/2007 |
| JP | 2008-89549 | 4/2008 |
| WO | 2009/004701 | 1/2009 |

* cited by examiner

FIG. 6

```
<cmdb>
  <Cis>
    <CI id="pm11" item="PM" />
    <CI id="pm12" item="PM" />
    <CI id="pm13" item="PM" />
    <CI id="va01" item="VM" />
    ....
    <CI id="Tb" item="Service" />
  </Cis>
  <Relations>
    <Relation id="rel01" src="va01" dst="pm11" type="vm-pm"/>
    <Relation id="rel02" src="pm11" dst="va01" type="pm-vm"/>
    ....
    <Relation id="rel24" src="vb01" dst="Tb" type="tenant-vm"/>
  </Relations>
</cmdb>
```

FIG. 7

| RELATION CLASS | DESCRIPTIONS | EXAMPLES |
|---|---|---|
| DEPENDED CLASS | WHEN source IS DOWN, target IS DOWN | PM (source) AND VM (target) |
| INFLUENCED CLASS | PERFORMANCE ERROR IN ONE ITEM OF SOURCE INFLUENCES PERFORMANCE OF THE SAME ITEM OF TARGET | VM (source) AND PM (target) |
| p-c CLASS | target USES source | • VM (source) and tenant (target)<br>• VM (source) IN app LAYER and VM (target) IN web LAYER<br>• VM (source) IN db LAYER and VM (target) IN app LAYER |

FIG. 8

RELATION CLASS APPLICATION RULE

| RULE id | CI TYPE OF src | CI TYPE OF dst | RELATION BETWEEN src AND dst | RELATION CLASS |
|---|---|---|---|---|
| 01 | PM | VM | execute(src,dst) | DEPENDED CLASS |
| 02 | VM | PM | execute(src,dst) | INFLUENCED CLASS |
| 03 | VM | VM | request(src,dst) | p-c CLASS |
| 04 | VM | Service | request(src,dst) | p-c CLASS |
| ... | | | | |

FIG. 9

OPERATION INFORMATION CIpm11 EXECUTION HISTORY

[2009-05-29 00:00:00] Shutdown CIvb01
...
[2009-05-29 00:09:00] Starting CIva01
...

FIG. 10

| OPERATION INFORMATION | COMMUNICATION HISTORY |
|---|---|
| ... [2009-05-29 00:00:00] Http GET from: CIva01 to: CITa ... | |

FIG. 11

```
<cmdb>
  <Cis>
    <CI id="pm11" item="PM" />
    <CI id="pm12" item="PM" />
    <CI id="pm13" item="PM" />
    <CI id="va01" item="VM" />
    ....
    <CI id="Tb" item="Service" />
  </Cis>
  <Relations>
    <Relation id="rel01" src="va01" dst="pm11" type="vm-pm"
      class="Impact"/>
    <Relation id="rel02" src="pm11" dst="va01" type="pm-vm"
      class="DependOn"/>
    ....
    <Relation id="rel24" src="vb01" dst="Tb" type="tenant-vm"
      class="p-c"/>
  </Relations>
</cmdb>
```

FIG. 12

| ERROR TYPE | OUTLINE OF CANDIDATE-LIMITED TREE CREATION |
|---|---|
| DOWN-RELATED | FOLLOW RELATION OF DEPENDED CLASS IN src |
| PERFORMANCE-ERROR-RELATED | FOLLOW RELATION OF INFLUENCED CLASS IN src |
| DELAY-RELATED | FOLLOW RELATION OF p-c CLASS IN src, RELATION OF CLASS FROM THE DESTINATION CI IN tgt, AND RELATION OF INFLUENCED CLASS FROM THE DESTINATION CI IN src. |

FIG. 13

| SYMPTOM DETECTED CI | SYMPTOM TYPE |
|---|---|
| Va01 | DOWN-RELATED |

| RELATION | NUMBER OF APPEARANCE | IMPORTANCE LEVEL | LEVEL ATTENUATION |
|---|---|---|---|
| rel07 | 0 | 1 | 6 |

CANDIDATE-LIMITED TREE

| CI | COUNT |
|---|---|
| vb02 | 1 |
| pm12 | 1 |

| RELATION | NUMBER OF APPEARANCE | IMPORTANCE LEVEL | LEVEL ATTENUATION |
|---|---|---|---|
| rel13 | 1 | 2 | 3 |
| rel02 | 1 | 2 | 3 |
| rel14 | 2 | 3 | 2 |
| rel06 | 2 | 3 | 2 |
| rel15 | 0 | 1 | 6 |
| rel10 | 0 | 1 | 6 |

CANDIDATE-LIMITED TREE

FIG. 27

| CI | COUNT |
|---|---|
| Ta | 1 |
| va01 | 1 |
| pm11 | 1 |
| va02 | 1 |
| pm12 | 1 |
| va03 | 1 |

| RELATION | NUMBER OF APPEARANCE | IMPORTANCE LEVEL | LEVEL ATTENUATION |
|---|---|---|---|
| rel16 | 0 | 1 | 6 |
| rel03 | 0 | 1 | 6 |
| rel17 | 4 | 5 | 1 |
| rel07 | 2 | 3 | 2 |
| rel18 | 0 | 1 | 6 |
| rel11 | 0 | 1 | 6 |

FIG. 31

| CI | COUNT |
|---|---|
| Tb | 1 |
| vb01 | 1 |
| vb02 | 1 |
| pm12 | 1 |
| vb03 | 1 |

APPARATUS AND METHOD FOR SELECTING CANDIDATE FOR FAILURE COMPONENT

CROSS-REFERENCE TO RELATED APPLICATION

This application is based upon and claims the benefit of priority of the prior Japanese Patent Application No. 2009-298877, filed on Dec. 28, 2009, the entire contents of which are incorporated herein by reference.

FIELD

The embodiments discussed herein are related to an apparatus and a method for selecting a candidate for a failure component causing errors from a plurality of components included in a network system.

BACKGROUND

Hitherto, when an error occurs in a large-scale system having many components, locating its cause has been desirable. It is desirable that a matrix of correlations between components of a system is created, and when an error occurs, the cause is located with reference to the matrix.

However, the technology in the past that creates a matrix of correlations for each system may desire recreation of a matrix every time its system configuration changes. In a system immediately after changed, less error information is available. Thus, locating a cause of an error may not be available if any with reference to the matrix. When identifying a cause with reference to the matrix is not available, an operator may be desirable to manually classify the trouble and as a result increase its man-hours.

With the increases in scale of systems, an environment of a virtualized system, what is called cloud environment has been increasingly used. One of advantages of a virtualized system is that its system configuration may be dynamically changed without influences on its services. Thus, the technology allowing support for location of a cause of an error if occurs even after the system configuration is changed is particularly desirable upon trouble investigation in the virtual environment.

In this way, it is desirable for technologies in the past to provide a sufficient support for trouble investigation in a large-scale system or virtual environment, and the implementation of a technology for supporting trouble investigation has been a desired goal.

SUMMARY

According to an aspect of an embodiment, an apparatus for selecting a candidate for a failure component causing errors from a plurality of components included in a network system, the apparatus includes a processor for executing a procedure, the procedure including determining a relation class of a relation among the plurality of components on the basis of configuration information of the network system, each of the relations being classified into one of the relation classes in accordance with a direction of an error propagation, determining an investigation range for each component having an error on the basis of investigation information including an error type of an error occurred in the each component and an investigation direction corresponding to the relation class, the investigation range being a set of the components to be investigated, and selecting a component on the basis of an appearance frequency of each component in the investigation ranges as the candidate for the failure component.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory diagram of a concrete example of configuration information;

FIG. 7 is an explanatory diagram of a concrete example of relation classes;

FIG. 8 is an explanatory diagram of a concrete example of a relation class application rule;

FIG. 9 is an explanatory diagram regarding an execution history of system operation information;

FIG. 10 is an explanatory diagram regarding a communication history of the system operation information;

FIG. 11 is an explanatory diagram of configuration information applying the relation classes;

FIG. 12 is an explanatory diagram of a concrete example of investigation details;

FIG. 13 is an explanatory diagram of a concrete example of error detection information;

FIG. 27 is an explanatory diagram of a number-of-appearance-of-CI count table acquired regarding the down of a CI;

FIG. 31 is an explanatory diagram of a number-of-appearance-of-CI count table acquired regarding the down of a CI.

DESCRIPTION OF EMBODIMENTS

Embodiments of a failure position estimation system, failure position estimation apparatus and failure position estimation method disclosed in the subject application will be described in detail below with reference to drawings. The embodiments do not limit the disclosed art.

Figure 1:
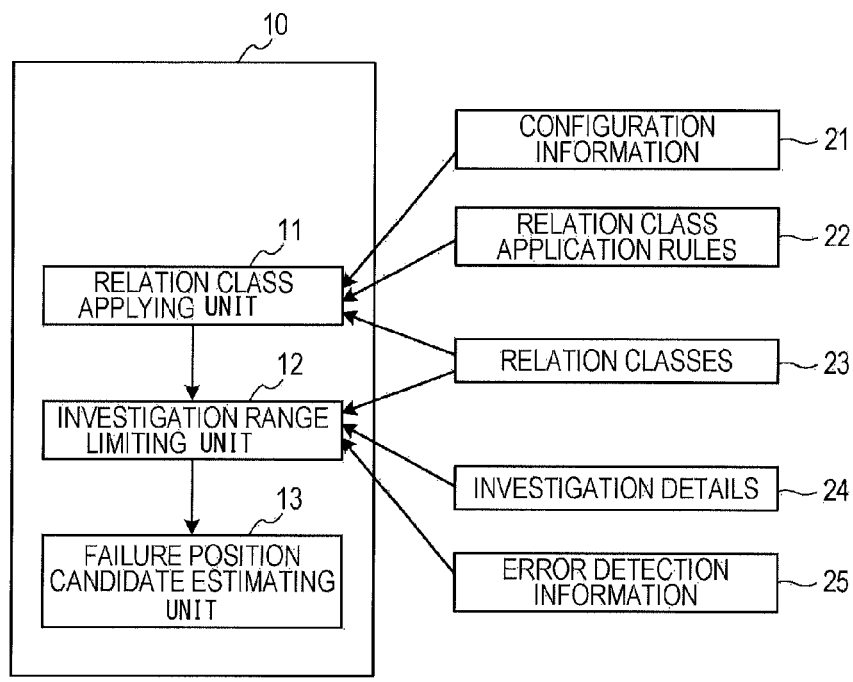
FIG. 1 is a schematic configuration diagram of a failure position estimation system according to a first embodiment.

FIG. 1 is a schematic configuration diagram of a failure position estimation system according to a first embodiment. A failure position estimation system 10 illustrated in FIG. 1 has a relation class applying unit 11 as an example of a relation class applying unit, an investigation range limiting unit 12 as an example of an investigation range determining unit, and a failure position candidate estimating unit 13 as an example of a choosing unit. The failure position estimation system 10 is configured with a computer system including a processor and a storage unit. The relation class applying unit 11, an investigation range limiting unit 12, and a failure position candidate estimating unit 13 are realized by causing the processor to execute a failure position estimation program.

The relation class applying unit 11 refers to configuration information 21, relation class application rules 22 and relation classes 23. The configuration information 21 is information describing components included in a network. The relation classes 23 are definition information on relation classes to which relations between components are classified on the basis of the direction of error propagation between components. The relation class application rules 22 are information that defines which relation class is to be applied to a relation between components on the basis of the type of the components. The relation class applying unit 11 applies a relation class to the relation between components included in the configuration information 21 on the basis of the relation class application rules 22. The configuration information 21, the relation class application rules 22 and the relation classes 23 is stored in the storage unit of the failure position estimation system 10.

The investigation range limiting unit 12 acquires an investigation-range-limited tree with reference to the relation classes 23, investigation details 24, and error detection information 25. The investigation details 24 are information on correspondence between the type of the error occurring in a component and the relation class and direction to be followed to investigate the cause of the error. The error detection information 25 is information resulting from detection of a component having an error and type of the error among components of a system. The investigation range limiting unit 12 acquires, as an investigation-range-limited tree as an example of an investigation range, components and relations followed within an investigation range regarding the component having an error.

The failure position candidate estimating unit 13 estimates a candidate position having a failure that causes an error on the basis of the frequency of appearance of the component in an investigation-range-limited tree acquired for each component having the error.

As described above, the failure position estimation system 10 according to this first embodiment classifies relations between components of a system into relation classes, follows components on the basis of the relation classes when an error occurs and identifies the range having a failure that causes the error.

In this way, locating a failure by using relation classes does not depend on the configuration of a network system and is highly generic. Thus, the technology may be applicable to a newly constructed network system and be applicable even to a network system having a changed configuration.

The trouble investigation in a large-scale network system or virtual environment may be supported by locating a failure.

The relation class applying unit 11, investigation range limiting unit 12, and failure position candidate estimating unit 13 may be distributed in a network system. Alternatively, a failure position estimation apparatus including the relation class applying unit 11, investigation range limiting unit 12, and failure position candidate estimating unit 13 in one housing may be provided.

Figure 2:
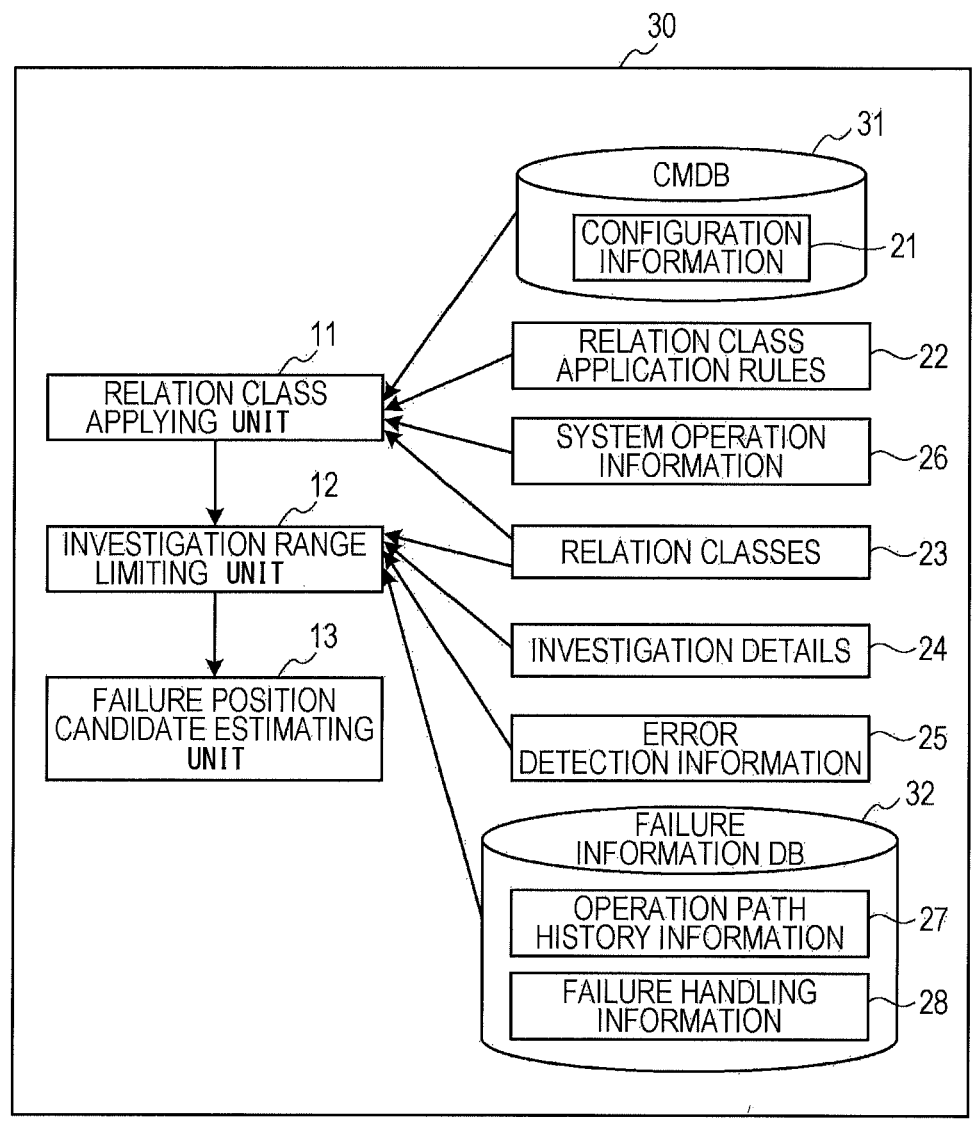
FIG. 2 is a schematic configuration diagram of a failure position estimation apparatus according to a second embodiment.

FIG. 2 is a schematic configuration diagram of a failure position estimation apparatus according to a second embodiment. The failure position estimation apparatus 30 illustrated in FIG. 1 has the relation class applying unit 11 as an example of a relation class applying unit, investigation range limiting unit 12 as an example of an investigation range determining unit, and failure position candidate estimating unit 13 as an example of a choosing unit. The failure position apparatus 30 is configured with a computer system including a processor and a data storage region. The relation class applying unit 11, an investigation range limiting unit 12, and a failure position candidate estimating unit 13 are realized by causing the processor to execute a failure position estimation program. The failure position estimation program may be recorded in a computer readable non-transitory medium such as a hard disk, a flexible disk (FD), a CD-ROM, an MO, and a DVD. A failure position estimation apparatus 30 of this embodiment further includes a configuration management database (CMDB) 31, and a failure information database (DB) 32 as examples of a storage unit the failure position estimation apparatus 30.

The CMDB 31 holds configuration information 21 that is information describing components included in a network. The failure information DB 32 is a database that holds a history of relations followed when an error has occurred in the past. The failure information DB 32 may hold operation path history information 27 and failure handling information 28, for example.

The operation path history information 27 is information describing a path of relations followed for locating a failure causing an error in the past. The failure handling information 28 includes path information from the component in which an error has been detected to the component identified as the cause of the error.

The failure position estimation apparatus 30 uses relation class application rules 22, a system operation information 26, relation classes 23, investigation details 24, and an error detection information 25. These kinds of information may be externally acquired as desired or may be recorded in/on an arbitrary recording medium within the failure position estimation apparatus 30.

The relation classes 23 are definition information of relation classes to which relations between components are classified on the basis of the direction of error propagation between components. The relation class application rules 22 are information that defines which relation class is to be applied to a relation between components on the basis of the types of the components.

The system operation information 26 is information regarding the operation state of a network system and includes histories of execution and/or communication by components thereof. The investigation details 24 are information describing correspondence between the type of error occurring in a component and a relation class and direction to be followed to investigate a cause of the error. The error detection information 25 is information as a result of detection of a component having an error and type of the error among components of a network system.

The relation class applying unit 11 refers to the configuration information 21, relation class application rules 22, system operation information 26 and relation classes 23 to apply a relation class to a relation between components included in the configuration information 21.

The investigation range limiting unit 12 refers to the relation classes 23, investigation details 24, error detection information 25, and failure information DB 32 to acquire, as an investigation-range-limited tree, components and relations followed in accordance with an investigation range for each component having an error.

The failure position candidate estimating unit 13 superimposes the investigation-range-limited trees acquired for the components having errors and estimates candidates of the position having a failure that causes the errors.

Figure 3:
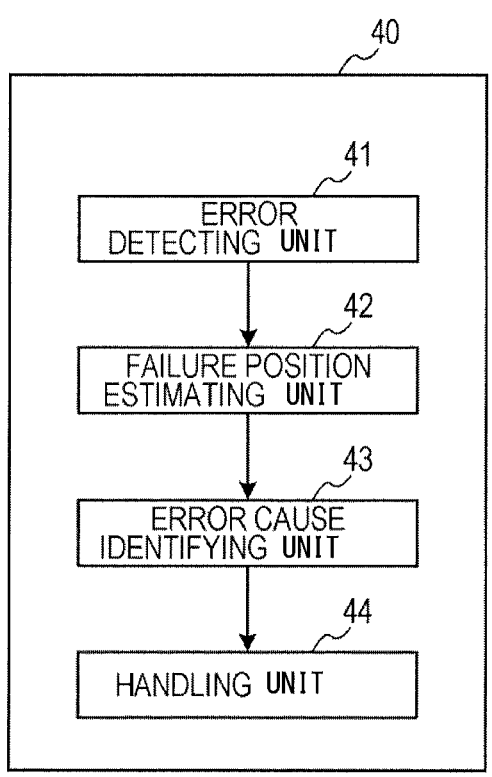
FIG. 3 is a schematic configuration diagram of a trouble investigation system that investigates a failure occurring in a network.

FIG. 3 is a schematic configuration diagram of a trouble investigation system that investigates a failure occurring in a network. A trouble investigation system 40 illustrated in FIG. 3 has an error detecting unit 41, a failure position estimating unit 42, an error cause identifying unit 43, a handling unit 44. The failure position estimation apparatus 30 illustrated in FIG. 2 functions as a failure position estimating unit 42.

The error detecting unit 41 detects an error occurring in a component of a network and notifies the detected error to the failure position estimating unit 42. The failure position estimation apparatus 30 functioning as the failure position estimating unit 42 uses the notified information as the error detection information 25. The failure position estimation apparatus 30 functioning as the failure position estimating unit 42 estimates candidates of the position having the failure causing the error and outputs them to the error cause identifying unit 43.

The error cause identifying unit 43 uses the output from the failure position estimating unit 42 to locate the failure causing the error. The handling unit 44 handles the located failure so as to overcome the error occurring.

Figure 4:
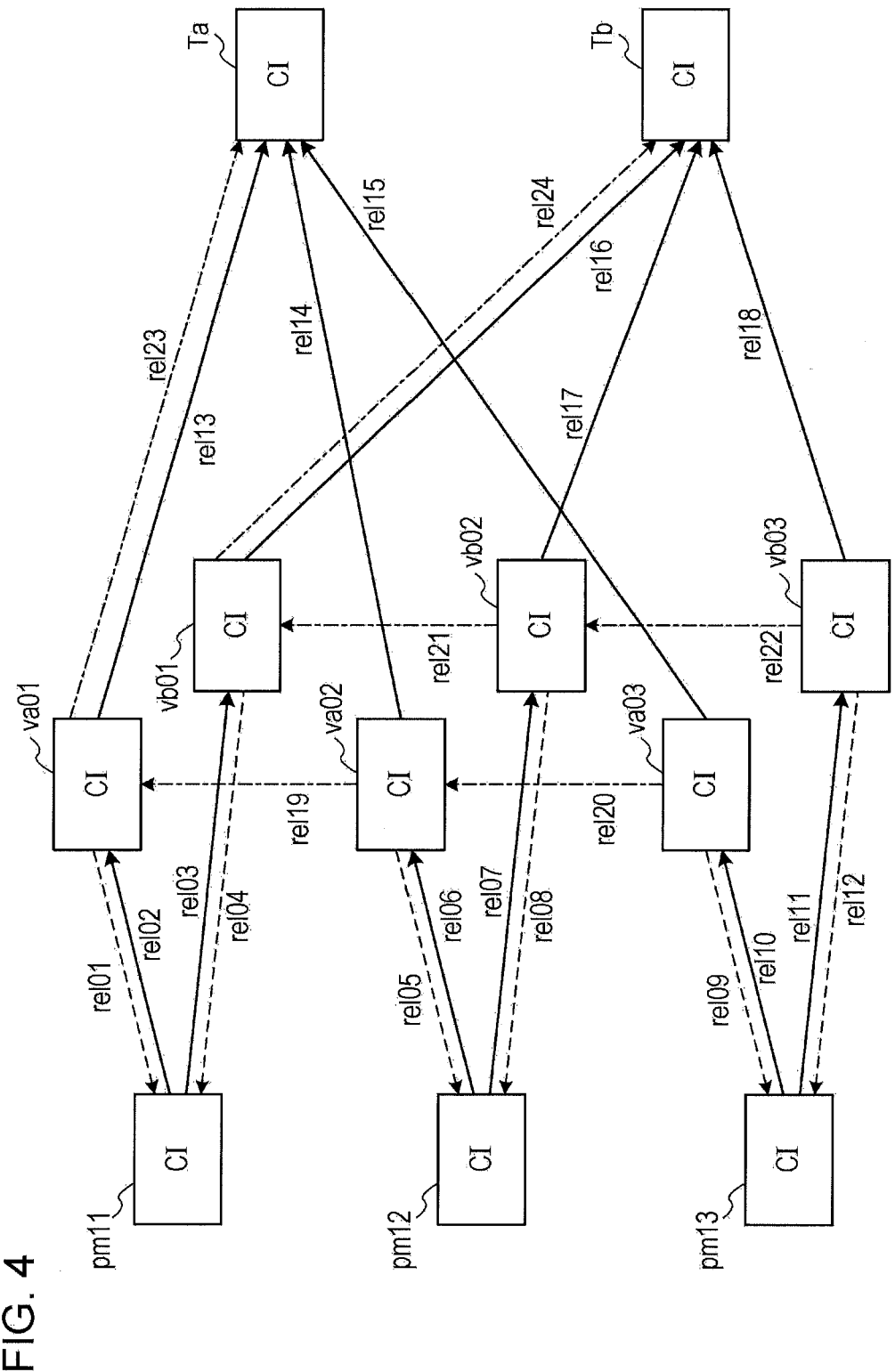
FIG. 4 is an explanatory diagram of a configuration example of a network.

FIG. 4 is an explanatory diagram of a configuration example of a network. The network illustrated in FIG. 4 has components of configuration items (CIs) pm11 to pm13, CIs va01 to va03, CIs vb01 to vb03, a CI Ta, and a CI Tb.

The network illustrated in FIG. 4 is a virtual network including the CI pm11 to pm13 as physical machines, the CIs va01 to va03 and CIs vb01 to vb03 as virtual machines and the CIs Ta and Tb as services. Each of the CIs may be a one computer, or the plurality of CIs may operate on one computer. Each of the CIs is given identification information uniquely defined in a network and can operate as an individual component. The information for identifying a CI is called an "instance".

A relation is defined between the CIs. The relation between the CIs is called a "relation". The direction is defined for a relation, and the origin of a relation is called a source (src) and the destination of a relation is called a target (tgt) or a destination (dst).

In a network illustrated in FIG. 4, relations rel01 to rel24 are defined. The relation rel01 has the CI va01 as its source and the CI pm11 as its target. The relation rel02 has the CI pm11 as its source and the CI va01 as its target. The relation rel03 has the CI pm11 as its source and the CI vb01 as its target. The relation rel04 has the CI vb01 as its source and the CI pm11 as its target. The relation rel05 has the CI va02 as its source and the CI pm12 as its target. The relation rel06 has the CI pm12 as its source and the CI va02 as its target. The relation rel07 has the CI pm12 as its source and the CI vb02 as its target. The relation rel08 has the CI vb02 as its source and the CI pm12 as its target. The relation rel09 has the CI va03 as its source and the CI pm13 as its target. The relation rel10 has the CI pm13 as its source and the CI va03 as its target. The relation rel11 has the CI pm13 as its source and the CI vb03 as its target. The relation rel12 has the CI vb03 as its source and the CI pm13 as its target. The relation rel13 has the CI va01 as its source and CI Ta as its target. The relation rel14 has the CI va02 as its source and the CI Ta as its target. The relation rel15 has the CI va03 as its source and the CI Ta as its target. The relation rel16 has the CI vb01 as its source and the CI Tb as its target. The relation rel17 has the CI vb02 as its source and the CI Tb as its target. The relation rel18 has the CI vb03 as its source and the CI Tb as its target. The relation rel19 has the CI va02 as its source and the CI va01 as its target. The relation rel20 has the CI va03 as its source and the CI va02 as its target. The relation rel21 has the CI vb02 as its source and the CI vb01 as its target. The relation rel22 has the CI vb03 as its source and the CI vb02 as its target. The relation rel23 has the CI va01 as its source and the CI Ta as its target. The relation rel24 has the CI vb01 as its source and the CI Tb as its target.

In the network, the CI Ta and CI Tb are accessed by clients, not illustrated, and provide predetermined services in response to the accesses. The CI va01 being a virtual machine is responsible for a web layer of a service provided by the CI Ta. The CI va02 being a virtual machine is responsible for an application layer of a service provided by the CI Ta. The CI va03 being a virtual machine is responsible for a database layer of a service provided by the CI Ta.

Similarly, the CI vb01 being a virtual machine is responsible for a web layer of a service provided by the CI Tb. The CI vb02 being a virtual machine is responsible for an application layer of a service provided by the CI Tb. The CI vb03 being a virtual machine is responsible for a database layer of a service provided by the CI Tb.

The virtual machine CI va01 and virtual machine CI vb01 which are responsible for the web layer use the CI pm11 being a physical machine. The virtual machine CI va02 and virtual machine CI vb02 which are responsible for the application layer use the CI pm12 being a physical machine. The virtual machine CI va03 and virtual machine CI vb03 which are responsible for the database layer use the CI pm13 being a physical machine.

When an error occurs in this network, the failure position estimation apparatus 30 creates investigation-range-limited trees by following relations from the CIs from which the error is detected, superimposes the investigation-range-limited trees and estimates candidates of the position having the failure causing the error.

Figure 5:
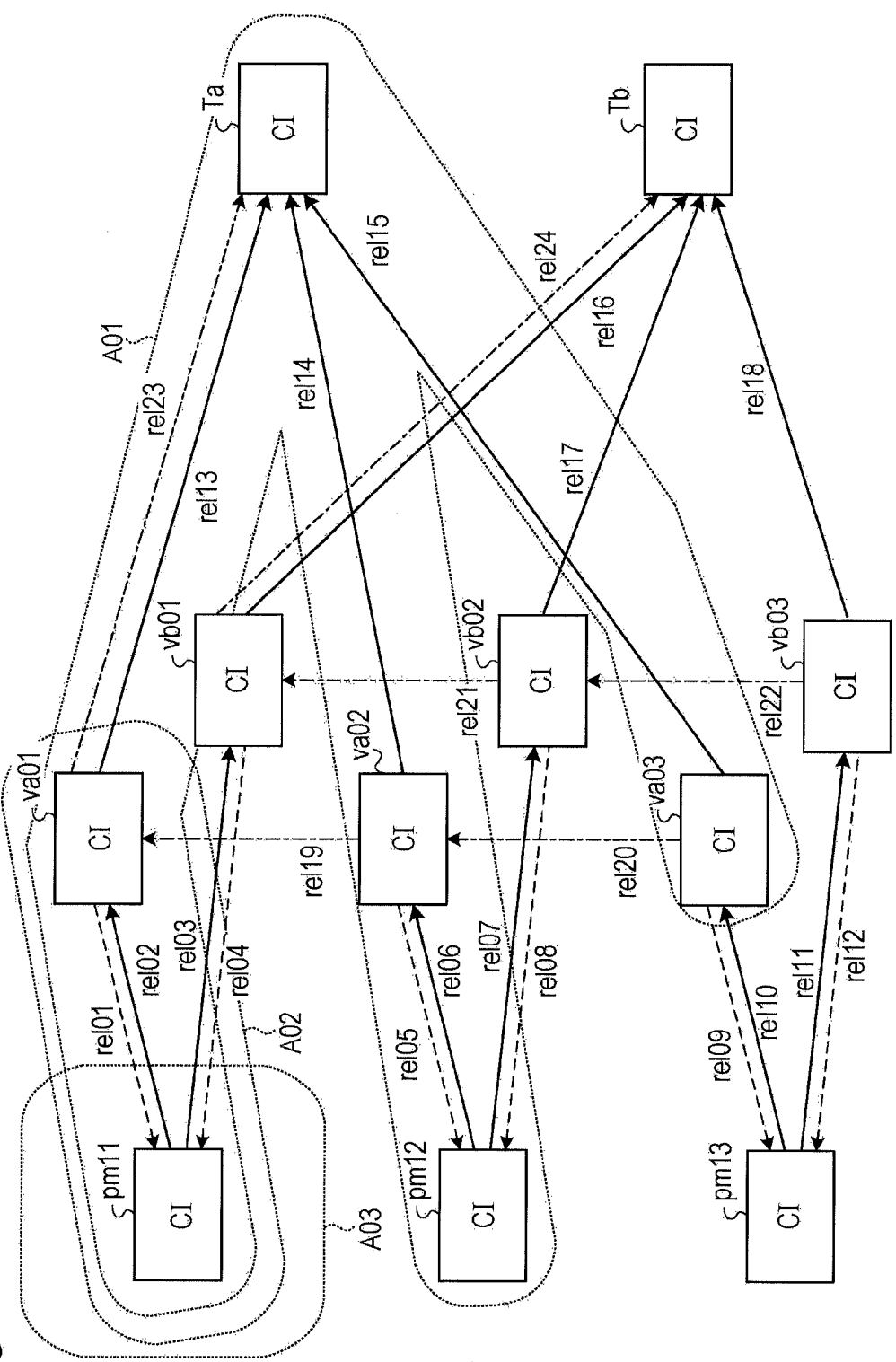
FIG. 5 is an explanatory diagram regarding the superimposition of investigation-range-limited trees.

FIG. 5 is an explanatory diagram regarding the superimposition of investigation-range-limited trees. FIG. 5 illustrates the example in which an error has been detected from the CI Ta, CI va01, and CI pm11. The failure position estimation apparatus 30 creates an investigation-range-limited tree A01 by following relations from the CI Ta. The investigation-range-limited tree A01 has a root in the CI Ta and the CI va01 to va03 as nodes connecting to the CI Ta. The investigation-range-limited tree A01 further has the CI pm11 as a node connecting to the CI va01 and the CI pm12 as a node connecting to the CI va02. Here, the investigation-range-limited tree A01 does not include the CI pm13. This is because the excessive increase in size of the investigation-range-limited trees may be prevented by limiting the range of relations to be followed for creating the investigation-range-limited trees. The range of relations to be followed for creating investigation-range-limited trees may be limited by defining its hop values and attenuations. The hop values and attenuations will be described below.

The failure position estimation apparatus 3 create an investigation-range-limited tree A02 by following relations from the CI va01. The investigation-range-limited tree A02 has a root in the CI va01 and the CI pm11 as a node connecting to the CI va01.

The failure position estimation apparatus 30 creates an investigation-range-limited tree A03 by following relations from the CI pm11. In the example illustrated in FIG. 5, no relations may be followed from the CI pm11, and the investigation-range-limited tree A03 only has the CI pm11.

The failure position estimation apparatus 30 superimposes the investigation-range-limited trees A01 to A03 and estimates the CI pm11 with maximum superimposition as a candidate of the position having a failure.

FIG. 6 is an explanatory diagram of a concrete example of the configuration information 21. The configuration information illustrated in FIG. 6 has a Cis tag that defines CIs and a Relations tag that define relations within a cmdb tag. The Cis tag contains descriptions of ids and types of CIs.

The example illustrated in FIG. 6 includes the CIs pm11 to pm13, CI va01, and CI Tb within the Cis tag. The CIs pm11 to pm13 have a type corresponding to a PM indicating it is a physical machine. Similarly, the CI va01 has a type corresponding to a VA indicating it is a virtual machine. The CI Tb has a type corresponding to a Service indicating it is a service.

The example illustrated in FIG. 6 has relations rel01, rel02, and rel24 within the Relations tag. The relation rel01 has the va01 as its source src and the pm11 as dst corresponding to the target and is associated with a vm-pm which is a type indicating a combination of the types of the source and target. The relation rel02 has the pm11 as its source src and the va01 as dst corresponding to the target and is associated with a pm-vm which is a type of a combination of the types of the source and target. The relation rel24 has the vb01 as its source src and Tb as dst corresponding to the target and is associated with a tenant-vm which is a type of a combination of the types of the source and target.

FIG. 7 is an explanatory diagram of a concrete example of the relation classes 23. The relation classes 23 define three relation classes of a dependent class, an influence class, and a p-c class. The dependent class is a relation in which when the CI being the source of a relation is down and stops operating, the CI being the target of the relation becomes down. A concrete example of the dependent class may be applicable to a relation in which a physical machine (PM) is its source, and a virtual machine (VM) is its target.

The influence class is a relation in which a performance error in the CI being the source of a relation influences the performance of the same item in the CI being the target of the relation. A concrete example of the influence class may be applicable to a relation in which a virtual machine (VM) is its source, and a physical machine (PM) is its target.

The p-c class is a relation in which the CI being the target of a relation uses the source of the relation. More specifically, the p-c class may be applicable to a relation in which a virtual machine (VM) is its source, and a tenant receiving a service is its target. The p-c class may further be applicable to a relation in which a virtual machine (VM) of an application layer is a source, and a virtual machine (VM) of a web layer is a target. Similarly, the p-c class may further be applicable to a relation in which a virtual machine (VM) of a database layer is a source, and a virtual machine (VM) of an application layer is a target.

FIG. 8 is an explanatory diagram of a concrete example of the relation class application rules 22. FIG. 8 illustrates four rules of rules id01 to id04 being relation class application rules, for example.

The rule id01 provides that the dependent class is applied as a relation class if its source is a physical machine (PM) and its target is a virtual machine (VM) and if the source CI is an execute (src, dst) that executes the target CI.

The rule id02 provides that the influence class is applied as a relation class if its source is a virtual machine (VM) and its target is a physical machine (PM) and is the source CI is an execute (src, dst) that executes the target CI.

The rule id03 provides that the p-c class is applied as a relation class if its source is a virtual machine (VM) and its target is a virtual machine (VM), and if the source CI is a request (src, dst) that requests the target CI.

The rule id04 provides that the p-c class is applied as a relation class is its source is a virtual machine (VM) and its target is a service, and if the source CI is a request (src, dst) that requests the target CI.

FIG. 9 is an explanatory diagram regarding an execution history of the system operation information 26. FIG. 9 illustrates an execution history of the CI pm11. In the example illustrated in FIG. 9, the CI pm11 shuts down the CI vb01 at 0:00 on May 29, 2009, and starts the CI va01 at 9:00 on May 29, 2009.

FIG. 10 is an explanatory diagram regarding a communication history of the system operation information 26. In the example illustrated in FIG. 10, the CI va01 communicates "Http GET from" with the CI Ta at 0:00 on May 29, 2009.

FIG. 11 is an explanatory diagram of configuration information applying the relation classes. Relation classes are added to the relations in addition to the configuration information illustrated in FIG. 6. More specifically, a description, class="Impact", indicating the relation class of the relation rel01 is added. Here, the Impact refers to the influence class. A description, class="DependOn", indicating the relation class of the relation rel02 is added. Here, the DependOn refers to the dependent class. A description, class="p-c", indicating the relation class of the relation rel24 is added.

Applying the relation classes to the relations in the network illustrated in FIG. 4, the relations rel01, rel04, rel05, rel08, rel09, and rel12 belong to the influence class. The relations belonging to the influence class are indicated by the broken arrows in FIG. 4. The relations rel02, rel03, rel06, rel07, rel10, rel11, and rel13 to rel18 belong to the dependent class. The relations belonging to the dependent class are indicated by the solid arrows in FIG. 4. The relations rel19 to rel24 belong to the p-c class. The relations belonging to the p-c class are indicated by the arrows with alternate long and short dashed lines in FIG. 4.

FIG. 12 is an explanatory diagram of a concrete example of the investigation details 24. The investigation details 24 provide that a relation belonging to the dependent class is to be followed toward its source if the type of the error occurring in a CI is down-related. The investigation details 24 further provide a relation belonging to the influence class is to be followed toward its source if the type of the error occurring in a CI is performance-error-related. The investigation details 24 further provide that a relation belonging to the p-c class is to be followed toward its source, then the relation belonging to the influence class is followed from the followed CI toward its target, and then the relation belonging to the influence class is followed from the followed CI toward its source when the type of the error occurring in a CI is delay-related.

FIG. 13 is an explanatory diagram of a concrete example of the error detection information 25. The error detection information 25 has the CI having an error and the type of symptom of the error occurring. In the example illustrated in FIG. 13, the CI va01 has a down-related error.

Figure 14:
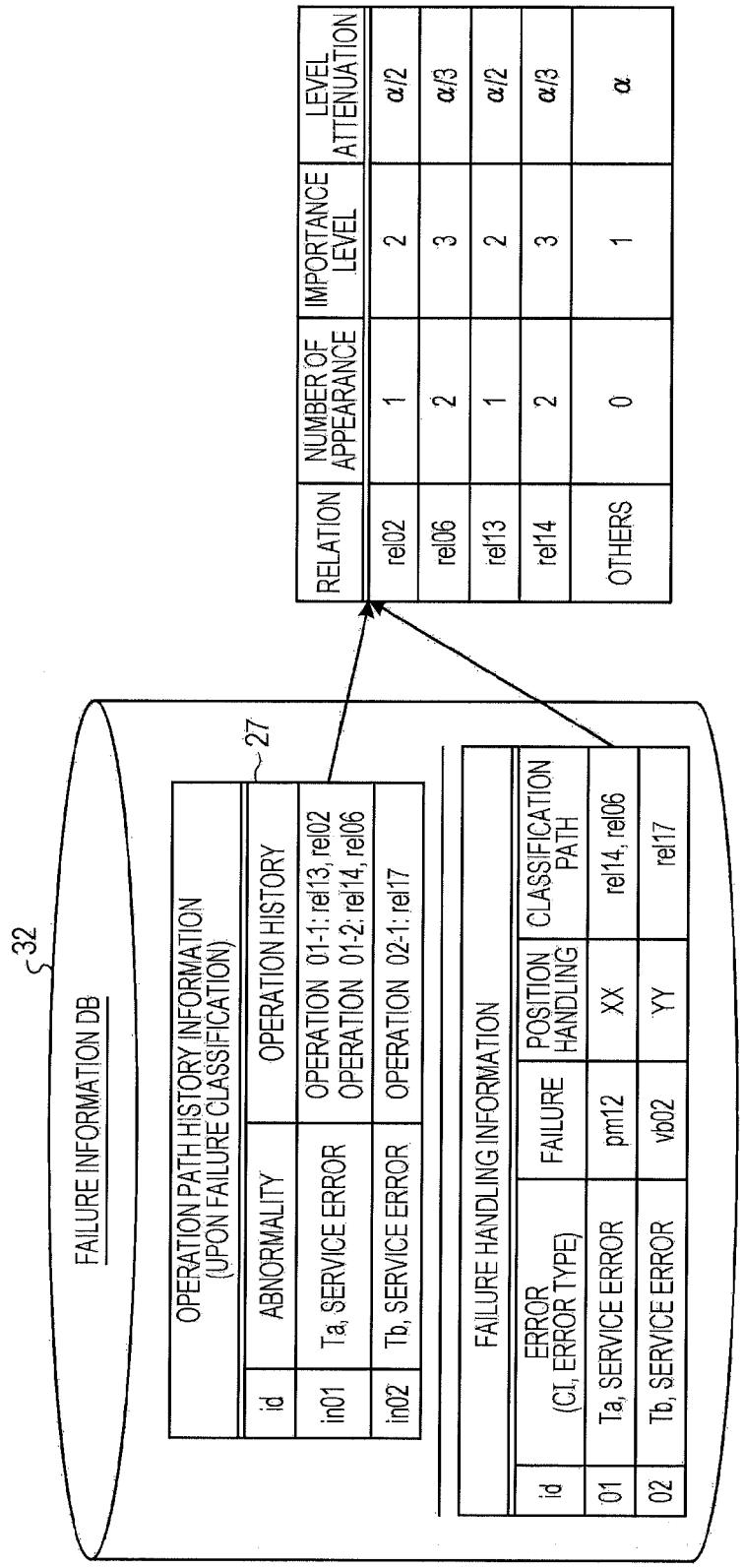
FIG. 14 is an explanatory diagram illustrating a failure information DB and attenuations.

FIG. 14 is an explanatory diagram illustrating a failure information DB 32 and attenuations. The failure information DB 32 has operation path history information 27 and failure handling information 28. The operation path history information 27 describes that the relation rel13 and relation rel02 are followed in a first operation 01-1 when a service error occurs in the CI Ta, and the relation rel14 and relation rel06 are followed in the next operation 01-2, resulting in location of the failure. The operation path history information 27 describes that the relation rel17 is followed in operation 02-1, resulting in location of the failure when a service error occurs in the CI Tb. The operation may include manual investigation by an operator or following back to the past by the failure position estimation apparatus 30.

The failure handling information 28 describes that the cause of the service error occurring in the CI Ta is the failure in the CI pm12 and that the paths from the CI Ta to the CI pm12 are the relations rel14 and rel06 and details of the handling of the failure. In the same manner, the failure handling information 28 describes that the cause of the service error occurring in the CI Tb is the failure in the CI vb02 and that the path from the CI Tb to the CI vb02 is the relation rel17 and details of the handling of the failure.

The investigation range limiting unit 12 uses the failure information DB 32 to determine the range of relations to be followed for creating investigation-range-limited trees. The failure position estimation apparatus 30 predetermines a hop value and decrements the hop value every time a relation is followed. Then, in the range where the hop value is not equal to or lower than 0, relations are followed to create investigation-range-limited trees. An attenuation refers to a value subtracted from the hop value when a relation is followed.

The investigation range limiting unit 12 defines a lower attenuation for a relation registered with the failure information DB 32. By changing the attenuation with reference to the histories, investigation-range-limited trees may be acquired which predominantly follows the range investigated in the past and/or the vicinity of the failure having caused an error in the past.

With reference to FIG. 14, the calculation of an attenuation for a service error in the Ta will be described. The investigation range limiting unit 12 counts the relations registered with the operation path history information 27 and failure handling information 28 for a service error in the Ta. The operation path history information 27 and failure handling information 28 has one appearance of the relation rel02, two appearances of the relation rel06, one appearance of the relation rel13, and two appearances of the relation rel14. The number of appearance of the other relations is zero.

The investigation range limiting unit 12 acquires the value of an importance level resulting from the addition of the number of appearance of a relation and 1. As a result, the relation rel02 has an importance level 2, the relation rel06 has an importance level 3, the relation rel13 has the importance level 2, the relation rel14 has the importance level 3, and other relations have an importance level 1.

The investigation range limiting unit 12 handles the attenuation of other relations, that is, relations not registered with the corresponding to errors in the failure information DB 32 as $\alpha$ and the value resulting from the division of $\alpha$ by an importance level as the attenuation of the corresponding relation. As a result, the relation rel02 has an attenuation $\alpha/2$, the relation rel06 has an attenuation $\alpha/3$, the relation rel13 has the attenuation $\alpha/2$, and the relation rel14 has the attenuation $\alpha/3$.

Figure 15:
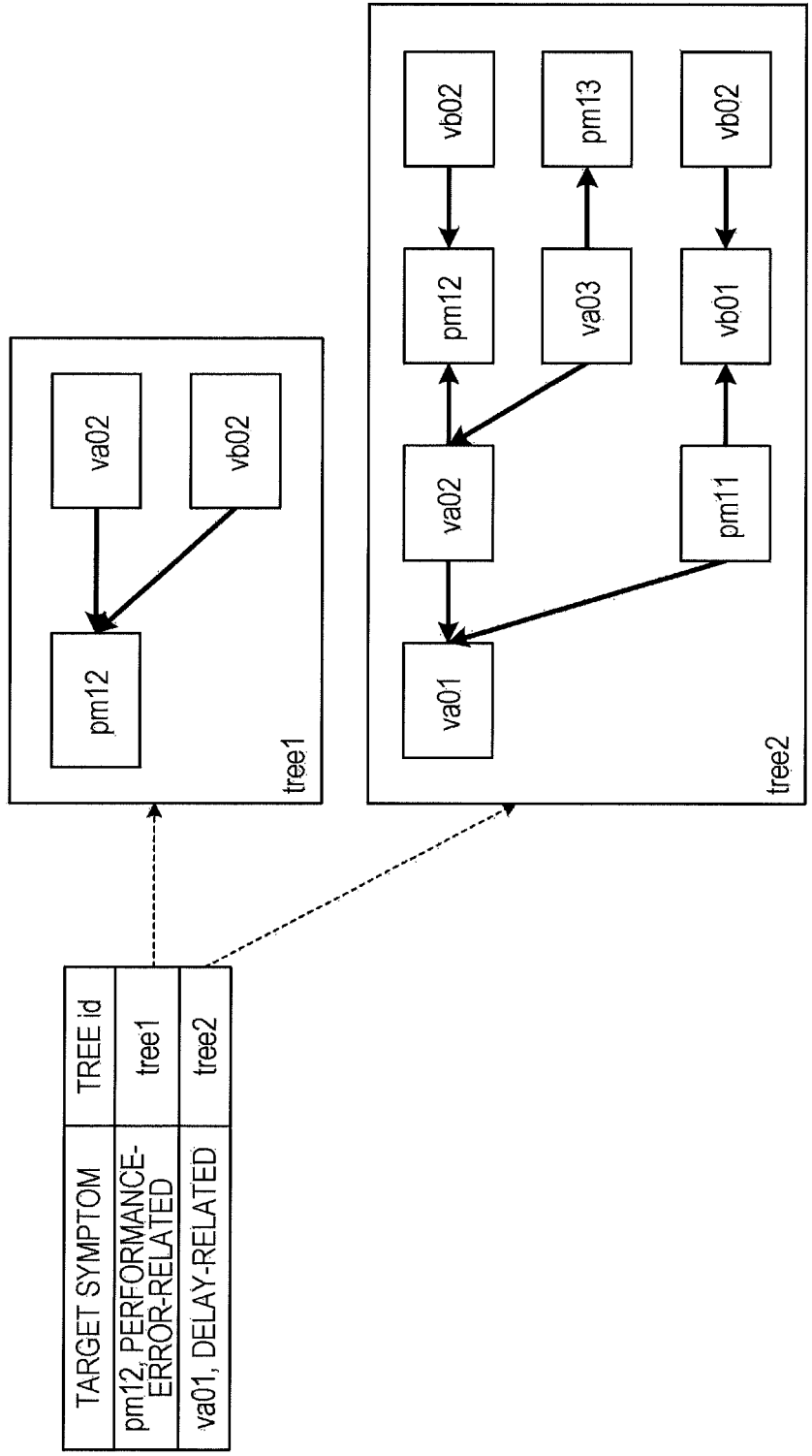
FIG. 15 is an explanatory diagram of investigation-range-limited trees created by an investigation range limiting unit.

FIG. 15 is an explanatory diagram of investigation-range-limited trees created by the investigation range limiting unit 12. The investigation range limiting unit 12 creates an investigation-range-limited tree for each detected error. In the example illustrated in FIG. 15, the investigation range limiting unit 12 creates an investigation-range-limited tree tree1 for a performance error detected in the CI pm12 and creates an investigation-range-limited tree tree2 for a delay detected in the CI va01.

The investigation-range-limited tree tree1 has a root in the CI pm11 and the CI va02 and CI vb02 connecting to the root as nodes. The investigation-range-limited tree tree2 has a root in the CI va01 and the CI va02 and CI pm11 connecting to the root as nodes. The investigation-range-limited tree tree2 has the CI pm12 and CI va03 connecting as nodes to the CI va02. The investigation-range-limited tree tree2 has the CI vb02 as a node connecting to the CI pm12 and the CI pm13 as a node connecting to the CI va03. In addition, the investigation-range-limited tree tree2 has the CI vb01 as a node connecting to the CI pm11 and the CI vb02 as a node connecting to the CI vb01.

Figure 16:
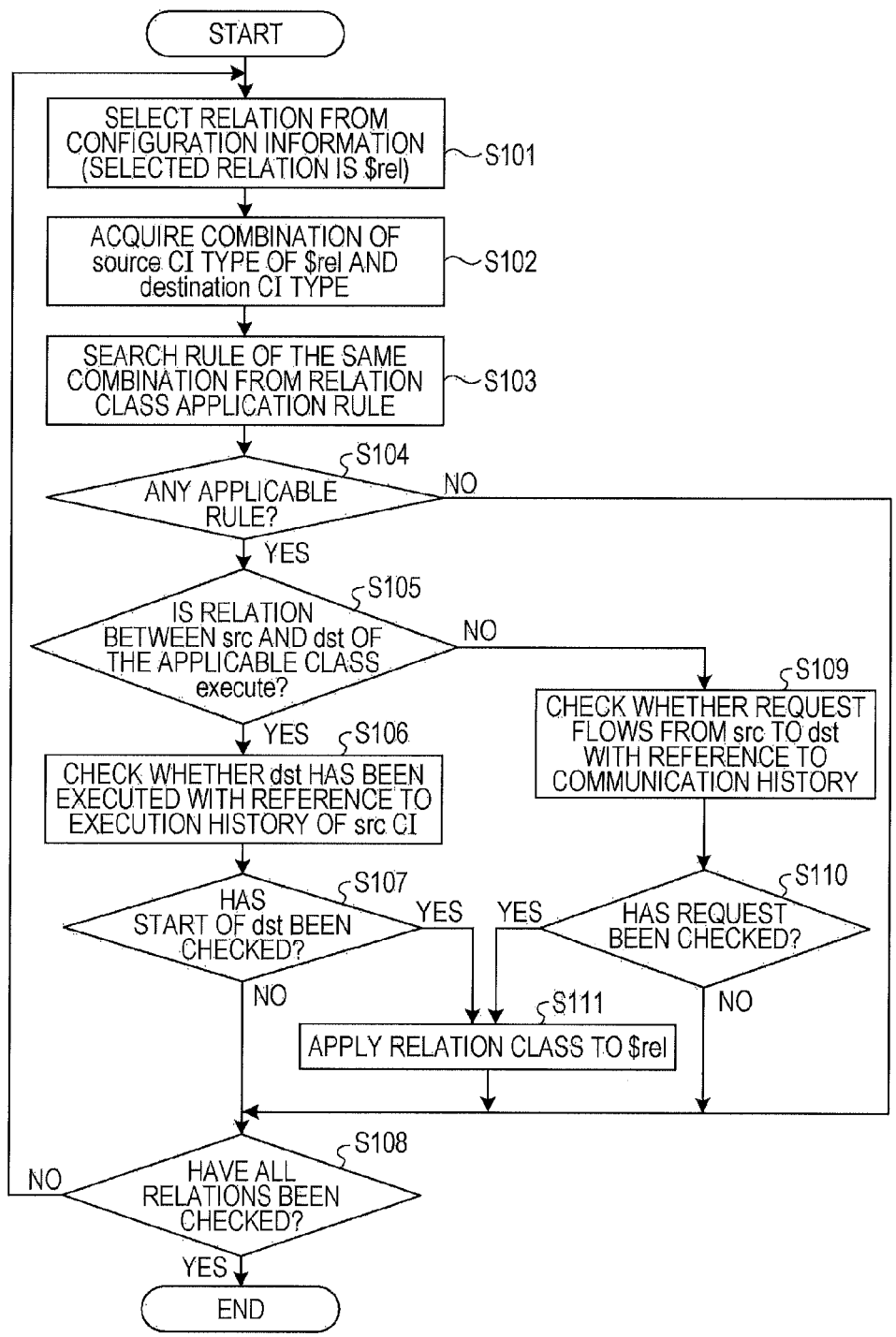
FIG. 16 is a flowchart describing processing operations by a relation class applying unit.

Next, processing operations by the failure position estimation apparatus 30 will be described. FIG. 16 is a flowchart describing processing operations by the relation class applying unit 11. The relation class applying unit 11 first selects a relation from the configuration information 21 (S101) and acquires a combination of the CI Type of the source of the selected relation $rel and the CI Type of its target, that is, the destination (S102).

The relation class applying unit 11 searches the rule corresponding to the same combination as the acquired combination through the relation class application rules 22 (S103). If the applicable rule exists (Yes in S104) as a result of the search, the relation between the src and dst in the applicable rule is referred.

If the relationship between the src and dst is an execute (Yes in S105), the relation class applying unit 11 refers to the execution history of the src CI in the system operation information 26 and checks whether any history exists in which the src CI has executed the dst CI or not (S106). If the execution on the dst CI is admitted (Yes in S107), the relation class applying unit 11 applies the relation class to the relation $rel (S111).

On the other hand, if the relationship between the src and dst in the applicable rule is not an execute, that is, if the relation between the src and dst is a request (No in S105), the relation class applying unit 11 checks from the communication history whether a request is flowing from the src to the dst or not (S109). If a request from the src to dst is admitted (Yes in S110), the relation class applying unit 11 applies the relation class to the relation $rel (S111).

After the application of the relation class (S111), if the start of the dst is not admitted (No in S107), if no requests are admitted (No in S110), or if the applicable rule does not exist (No in S104), the relation class applying unit 11 determines whether the checks have been performed on all relations in the configuration information 21 or not (S108). If any relation has not been checked (No in S108), the relation class applying unit 11 selects the next relation (S101). After the check on all relations in the configuration information 21 (Yes in S108), the relation class applying unit 11 ends the processing.

Figure 17:
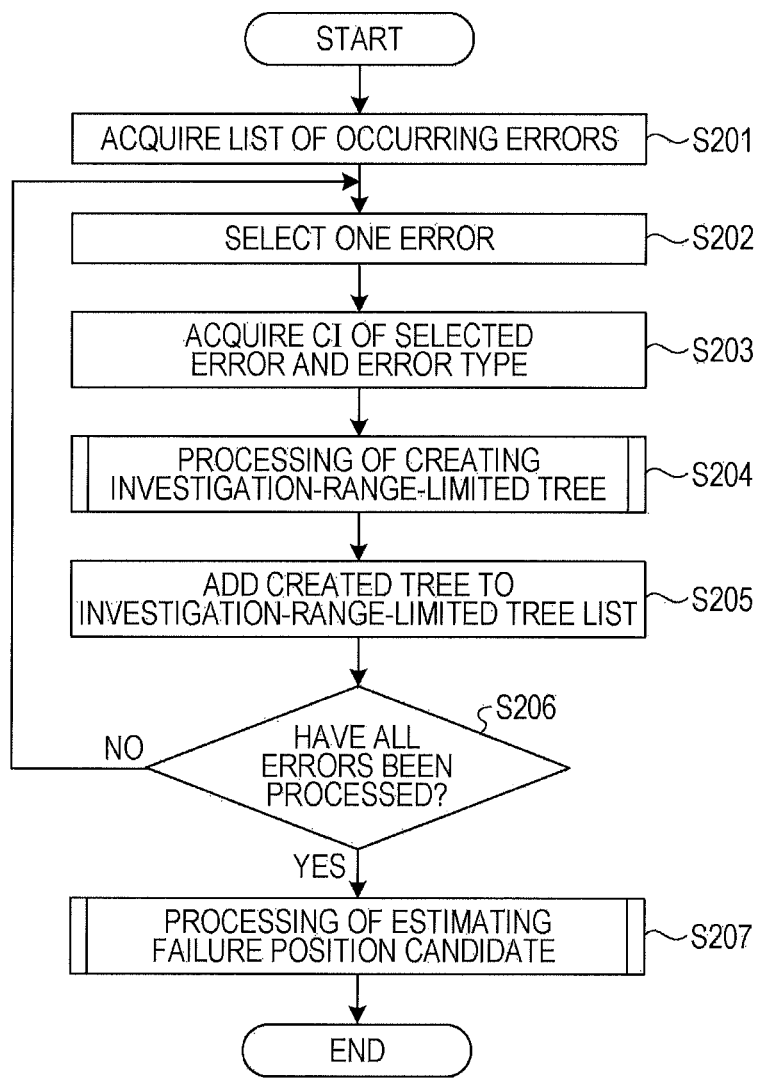
FIG. 17 is a flowchart describing processing operations by the investigation range limiting unit.

FIG. 17 is a flowchart describing processing operations by the investigation range limiting unit 12. The investigation range limiting unit 12 acquires a list of occurring errors from the error detection information 25 (S201) and selects one error (S202). The investigation range limiting unit 12 acquires the CIs and error type of the selected error (S203) and performs investigation-range-limited tree creation processing (S204).

The investigation range limiting unit 12 adds the created investigation-range-limited tree to an investigation-range-limited tree list (S205) and determines whether all errors have been processed or not (S206). If any unprocessed error remains (No in S206), the investigation range limiting unit 12 selects the next error from the list of errors (S202).

If all errors have been processed (Yes in S206), the investigation range limiting unit 12 outputs the created investigation-range-limited tree list to the failure position candidate estimating unit 13, causes the failure position candidate estimating unit 13 to perform failure position candidate estimation processing (S207) and ends the processing.

Figure 18:
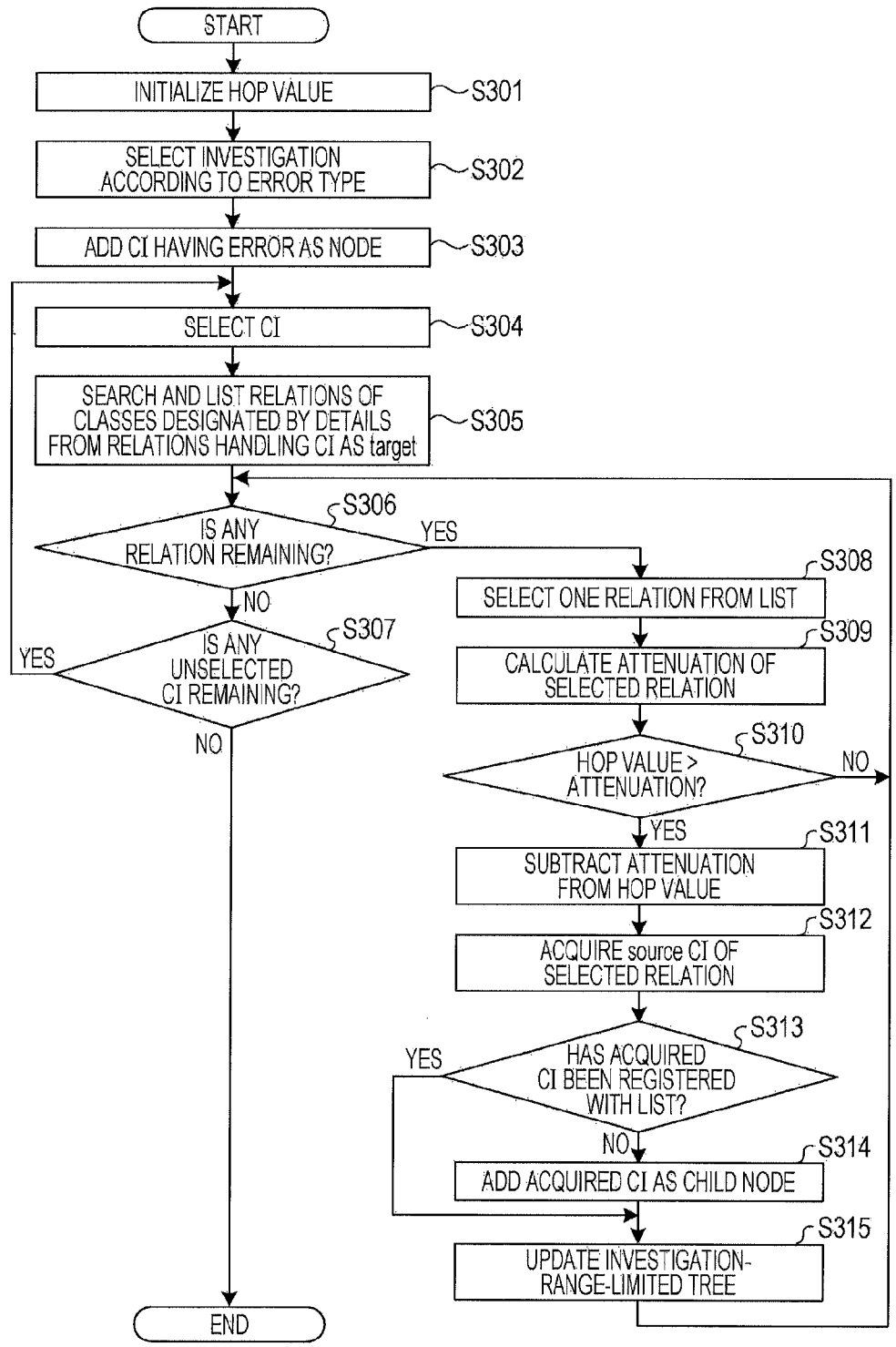
FIG. 18 is a flowchart describing the investigation-range-limited tree creation processing described in FIG. 17.

FIG. 18 is a flowchart describing the investigation-range-limited tree creation processing described in FIG. 17. The investigation range limiting unit 12 initializes the hop value (S301) and selects the investigation details corresponding to the error type (S302). The investigation range limiting unit 12 then adds the CI having the error as a root to the node (S303).

The investigation range limiting unit 12 selects a CI from the node (S304) and retrieves relations of the class identified by the investigation details from the relations having the selected CI as their target and make a list of them (S305).

If any relation remains in the list (Yes in S306), the investigation range limiting unit 12 selects one relation from the list (S308) and calculates the attenuation of the selected relation (S309). If the calculated attenuation is lower than the hop value (Yes in S310), the investigation range limiting unit 12 subtracts the attenuation from the hop value to update the hop value (S311). The investigation range limiting unit 12 acquires the CI being the source of the selected relation (S312) and determines whether the acquired CI has been registered with the list of nodes or not (S313).

If the acquired CI has not been registered with the list of node (No in S313), the investigation range limiting unit 12 adds the acquired CI to the list of node as a child node (S314). After the addition of the child node or if the acquired CI has already been registered (Yes in S313), the investigation range limiting unit 12 updates the investigation-range-limited tree (S315). If a child node is added, the present hop value is stored in the child node in association.

After the update of the investigation-range-limited tree (S315) or if the attenuation is equal to or higher than the hop value (No in S310), the investigation range limiting unit 12 determines whether any relation of the selected CI remains in the list or not (S306).

If no relation of the selected CI remains in the list (No in S306), the investigation range limiting unit 12 determines whether any unselected CI remains as a node or not (S307). If some unselected CI remains (Yes in S307), the investigation range limiting unit 12 returns to the CI selecting operation (S304). If no unselected CI remains (No in S307), the investigation range limiting unit 12 ends the processing.

Figure 19:
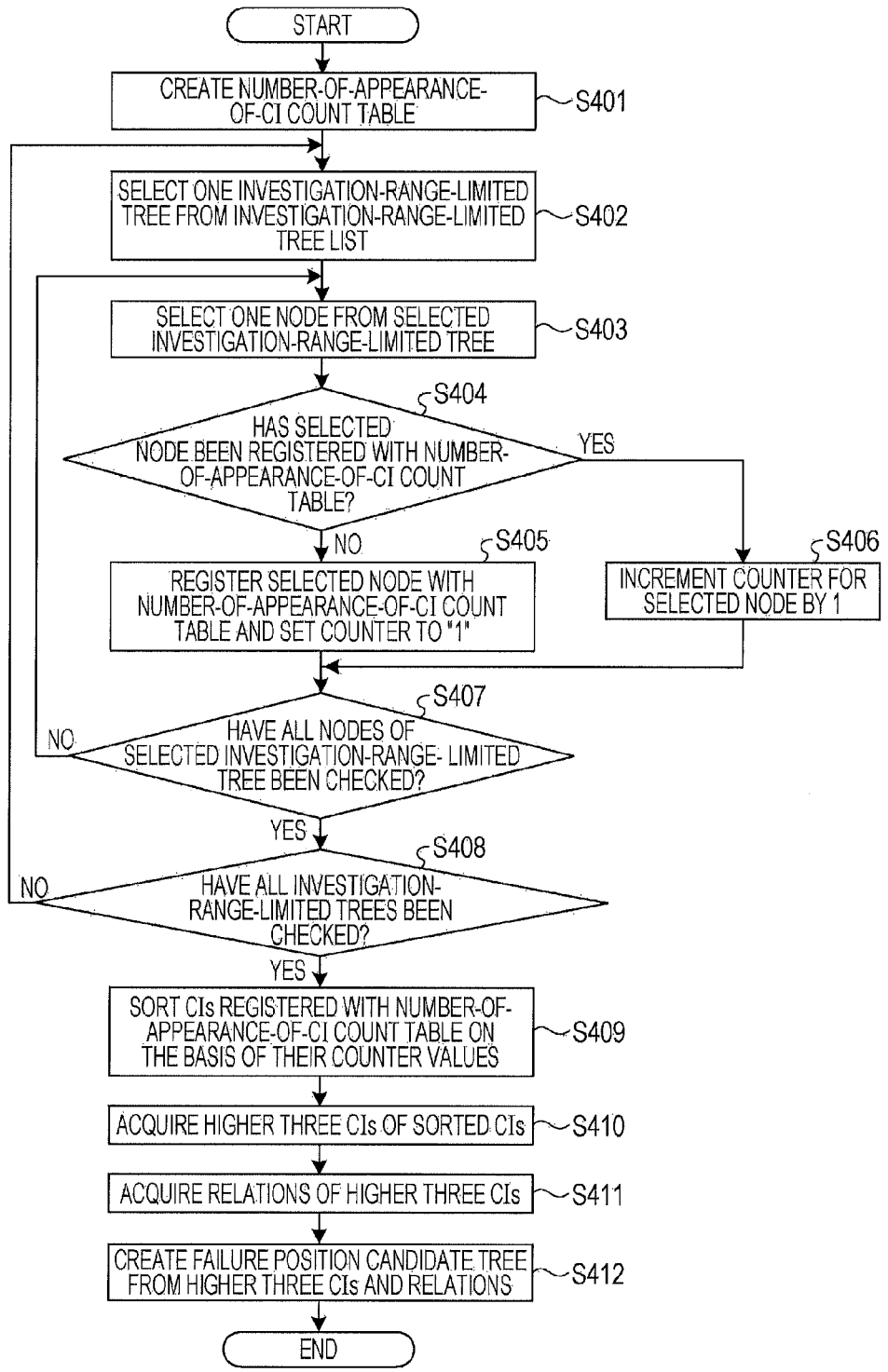
FIG. 19 is a flowchart describing failure position candidate estimation processing by a failure position candidate estimating unit.

FIG. 19 is a flowchart describing failure position candidate estimation processing by the failure position candidate estimating unit 13. The failure position candidate estimating unit 13 creates a number-of-appearance-of-CI count table (S401). The number-of-appearance-of-CI count table when created is empty data with no CIs registered.

The failure position candidate estimating unit 13 selects one investigation-range-limited tree from the investigation-range-limited tree list created by the investigation range limiting unit 12 (S402). Next, the failure position candidate estimating unit 13 selects one node from the selected investigation-range-limited tree (S403).

The failure position candidate estimating unit 13 checks whether the select node has been registered with the number-of-appearance-of-CI count table or not (S404). If the selected node has not been registered with the number-of-appearance-of-CI count table (No in S404), the failure position candidate estimating unit 13 registers the selected node with the number-of-appearance-of-CI count table and sets a counter therefor to 1 (S405). On the other hand, if the selected node is registered with the number-of-appearance-of-CI count table (Yes in S404), the failure position candidate estimating unit 13 increments the counter for the selected node by 1 (S406).

After step S405 or step S406, the failure position candidate estimating unit 13 determines whether the checks on all nodes in the selected investigation-range-limited tree have completed or not (S407). If some node has not been checked in the selected investigation-range-limited tree (No in S407), the failure position candidate estimating unit 13 returns to the operation of selecting a node from the selected investigation-range-limited tree (S403).

If the checks on all nodes in the selected investigation-range-limited tree have completed (Yes in S407), the failure position candidate estimating unit 13 determines whether all investigation-range-limited trees have been checked or not (S408).

If some unchecked investigation-range-limited tree remains (No in S408), the failure position candidate estimating unit 13 returns to the operation of selecting an investigation-range-limited tree (S402). If all investigation-range-limited trees have been checked (Yes in S408), the failure position candidate estimating unit 13 sorts the CIs registered with the number-of-appearance-of-CI count table by the values of the counters therefor (S409).

The failure position candidate estimating unit 13 acquires higher three CIs with higher values at the counters from the sorted CIs (S410). The failure position candidate estimating unit 13 acquires the relations between the acquired higher three CIs (S411), creates a failure position candidate tree from the higher three CI and their relations (S412) and ends the processing.

Next, a concrete example of operations by the failure position estimation apparatus 30 will be described. The condition is assumed, for example, in which in the network illustrated in FIG. 4, the CI vb02, CI Ta, and CI Tb are down, and a service error occurs in the CI Ta, and CI Tb. It is further assumed that the initial hop value is 10 and the basic value α of the attenuation is 6.

Figure 20:
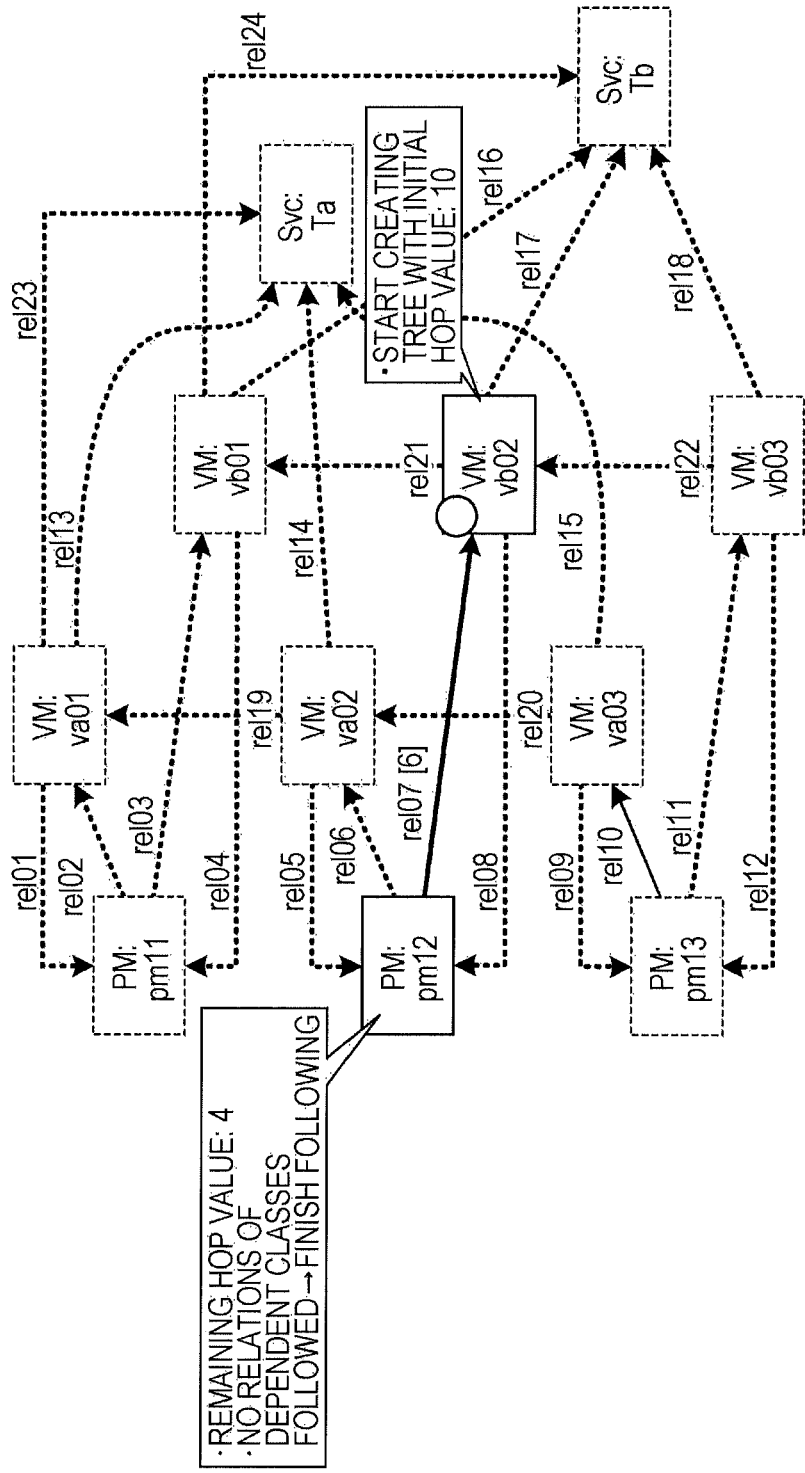
FIG. 20 is an explanatory diagram of creation of an investigation-range-limited tree from a CI.

The investigation range limiting unit 12 creates an investigation-range-limited tree regarding the down of the CI vb02. The investigation range limiting unit 12 refers to the investigation details 24 and determines that it is a down-related error. Thus, the investigation range limiting unit 12 determines to follow the dependent class from the CI vb02 to its source. As illustrated in FIG. 20, the dependent class having the CI vb02 as its target is the relation rel07.

Figures 21, 22, 23:
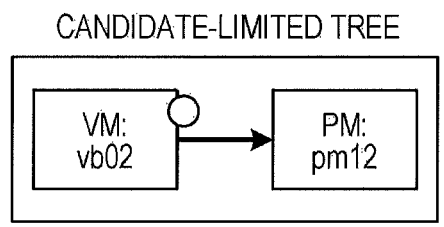
FIG. 21 is an explanatory diagram of an attenuation regarding the down of a CI.
FIG. 22 is an explanatory diagram of an investigation-range-limited tree acquired regarding the down of a CI.
FIG. 23 is an explanatory diagram of a number-of-appearance-of-CI count table acquired regarding the down of a CI.

The investigation range limiting unit 12 refers to the failure information DB 32 and thus acquires the attenuation of the relation rel07. FIG. 21 describes the attenuation of the relation rel07, which is acquired by the investigation range limiting unit 12. In the failure information DB 32, the relation rel07 has a number of appearance of 0, an importance level of 1 and an attenuation of 6.

Since the attenuation 6 is lower than a hop value of 10, the investigation range limiting unit 12 follows the relation rel07 from the CI vb02 and registers the CI pm12 as a node. Since no relation belongs to the dependent class having the CI pm12 as its target, the investigation range limiting unit 12 handles the CI pm12 as a node and ends the creation of the failure position candidate tree.

FIG. 22 illustrates an investigation-range-limited tree acquired as a result of the down of the CI vb02. The CI vb02 becomes its root, and the CI pm12 is connected thereto as a node. Creating a number-of-appearance-of-CI count table regarding the investigation-range-limited tree, the CI vb02 and CI pm12 have a value of 1, as illustrated in FIG. 23.

Figure 24:
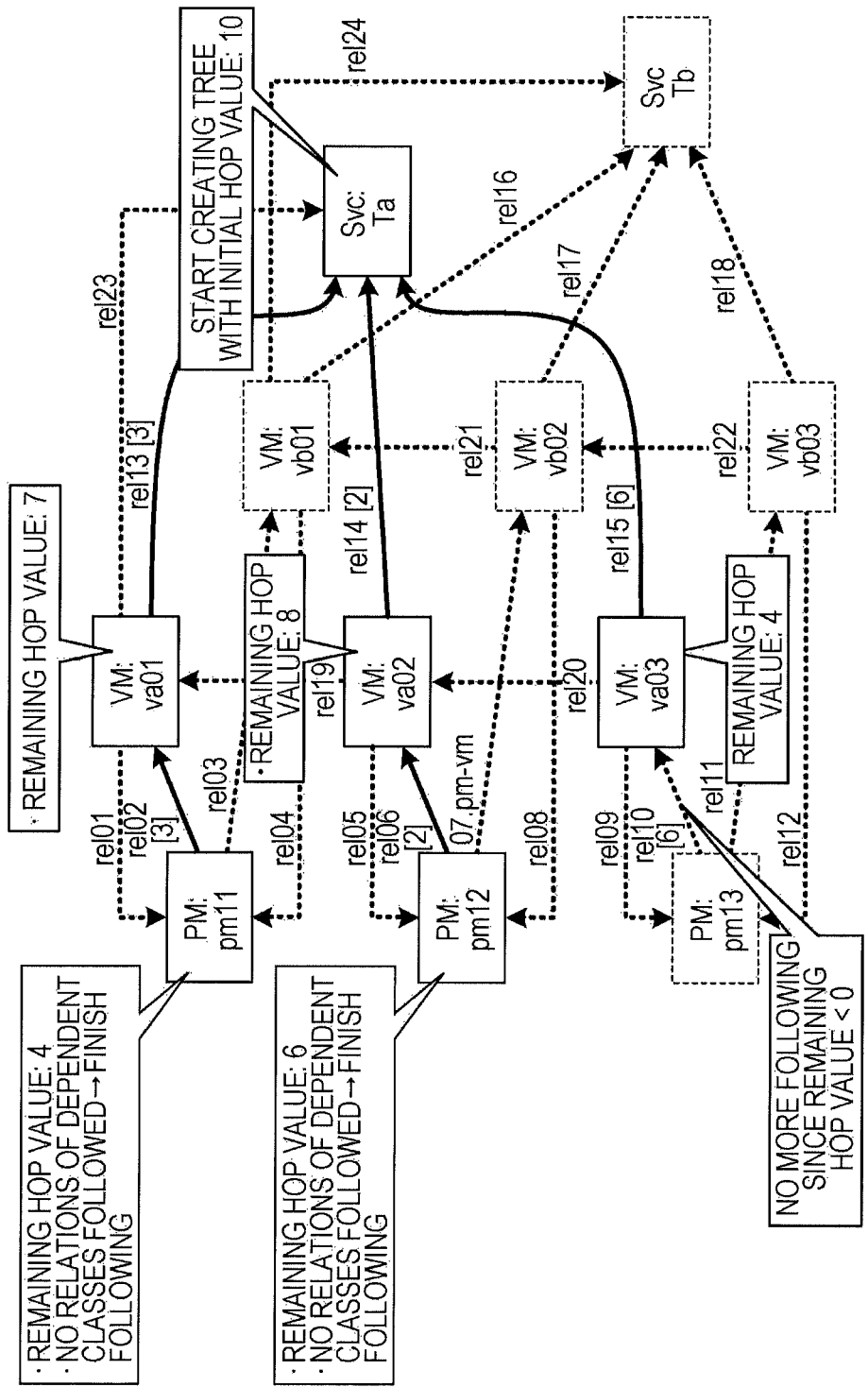
FIG. 24 is an explanatory diagram of creation of an investigation-range-limited tree from a CI.

Similarly, the investigation range limiting unit 12 creates an investigation-range-limited tree regarding the down of the CI Ta. The investigation range limiting unit 12 refers to the investigation details 24 and determines that it is a down-related error. Thus, the investigation range limiting unit 12 determines to follow the dependent class from the CI Ta to its source. As illustrated in FIG. 24, the dependent classes having the CI Ta as its target relation are the relations rel13 to rel15.

Figures 25, 26:
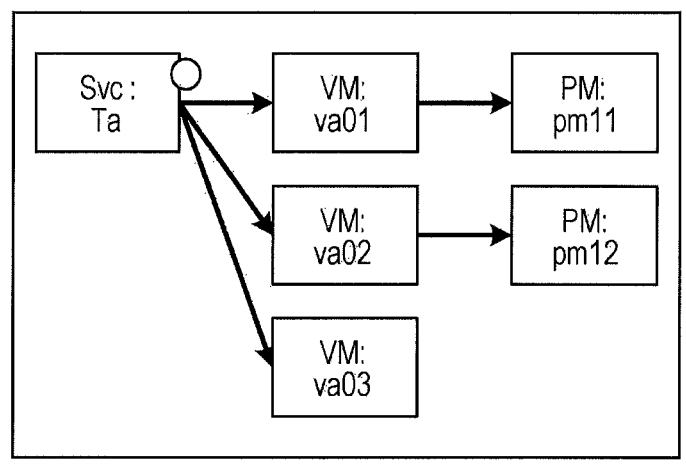
FIG. 25 is an explanatory diagram of attenuations regarding the down of a CI.
FIG. 26 is an explanatory diagram of an investigation-range-limited tree acquired regarding the down of a CI.

The investigation range limiting unit 12 refers to the failure information DB 32 and acquires the attenuations of the relations rel13 to rel15. FIG. 25 illustrates the attenuations acquired by the investigation range limiting unit 12. In the failure information DB 32, the relation rel13 has a number of appearances of 1, an importance level of 2 and an attenuation of 3. In the failure information DB 32, the relation rel14 has a number of appearance of 2, an importance level of 3 and an attenuation of 2. In the failure information DB 32, the relation rel15 has a number of appearance of 0, an importance level of 1 and an attenuation of 6.

Since the attenuation of the relation rel13 is 3 and is lower than a hop value of 10 in the CI Ta, the investigation range limiting unit 12 follows the relation rel13 and registers the CI va01 as a node. The subtraction of the attenuation 3 from the hop value in the CI va01 results in 7.

Since the attenuation of the relation rel14 is 2 and is lower than a hop value of 10 in the CI Ta, the investigation range limiting unit 12 follows the relation rel14 and registers the CI va02 as a node. The subtraction of the attenuation 2 from the hop value in the CI va02 results in 8.

Since the attenuation of the relation rel15 is 6 and is lower than a hop value of 10 in the CI Ta, the investigation range limiting unit 12 follows the relation rel15 and registers the CI va03 as a node. The subtraction of the attenuation 6 from the hop value in the CI va03 results in 4.

The dependent class having the CI va01 registered as a node as its target is the relation rel02. The dependent class having the CI va02 is the relation rel06. The dependent class having the CI va03 is the relation rel10.

The investigation range limiting unit 12 refers to the failure information DB 32 and acquires the attenuations of the relations rel02, rel06, and rel10. FIG. 25 further illustrates the attenuations of the relation rel02, rel06, and rel10. In the failure information DB 32, the relation rel02 has a number of appearances of 1, an importance level of 2 and an attenuation of 3. In the failure information DB 32, the relation rel06 has a number of appearance of 2, an importance level of 3 and an attenuation of 2. In the failure information DB 32, the relation rel10 has a number of appearance of 0, an importance level of 1 and an attenuation of 6.

Since the attenuation of the relation rel02 is 3 and is lower than a hop value of 7 in the CI va01, the investigation range limiting unit 12 follows the relation rel02 registers the CI pm11 as a node. The subtraction of the attenuation 3 from the hop value in the CI pm11 results in 4. Since no relations belonging to the dependent class has the CI pm11 as its target, the investigation range limiting unit 12 stops following relations with the CI pm11.

Since the attenuation of the relation rel06 is 2 and is lower than a hop value of 8 in the CI va02, the investigation range limiting unit 12 follows the relation rel06 and registers the CI pm12 as a node. The subtraction of the attenuation 2 from the hop value in the CI pm12 results in 6. Since no relation belonging to the dependent class has the CI pm12 as its target, the investigation range limiting unit 12 stops following relations with the CI pm12.

Since the attenuation of the relation rel10 is 6 and is equal to or higher than a hop value of 4 in the CI va03, the investigation range limiting unit 12 stops following relations with the CI va03.

FIG. 26 is an investigation-range-limited tree acquired as a result of the down of the CI Ta. The CI Ta becomes its root, and the CIs va01 to va03 are connected thereto as nodes. The CI pm 11 is connected to the CI va01 as a node, and the CI pm12 is connected to the CI va02 as a node. Creating a number-of-appearance-of-CI count table regarding the investigation-range-limited tree, the CI Ta, CIs va01 to va03, and CIs pm11 to pm12 have a value of 1, as illustrated in FIG. 27.

Figure 28:
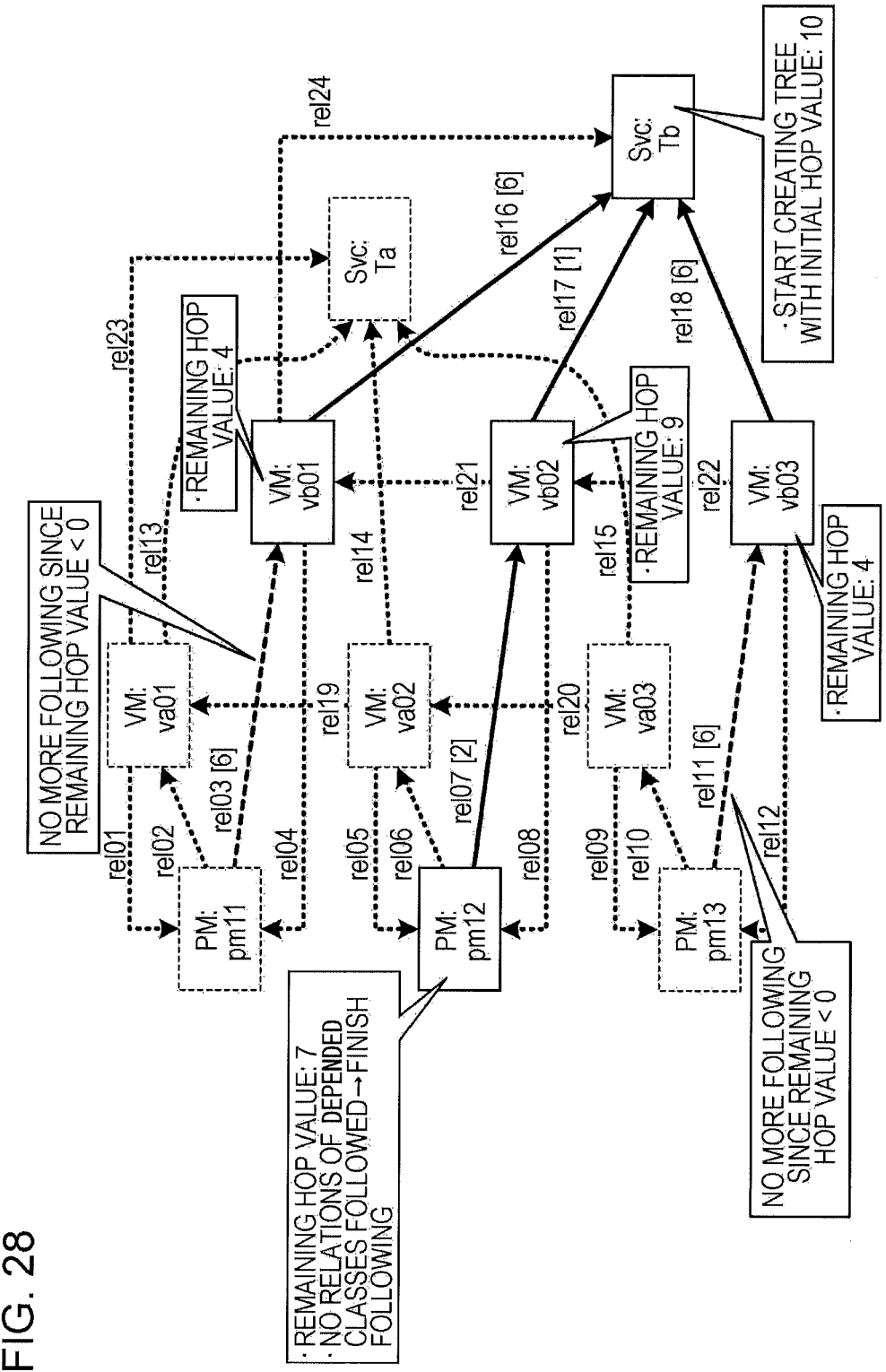
FIG. 28 is an explanatory diagram of creation of an investigation-range-limited tree from a CI.

Similarly, the investigation range limiting unit 12 creates an investigation-range-limited tree regarding the down of the CI Tb. The investigation range limiting unit 12 refers to the investigation details 24 and determines that it is a down-related error. Thus, the investigation range limiting unit 12 determines to follow the dependent class from the CI Tb to its source. As illustrated in FIG. 28, the dependent classes having the CI Tb as its target are relations rel16 to rel18.

Figures 29, 30:
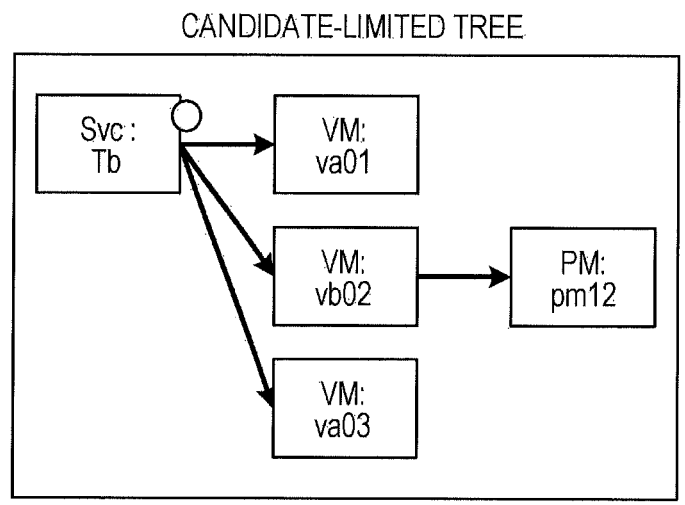
FIG. 29 is an explanatory diagram of attenuations regarding the down of a CI.
FIG. 30 is an explanatory diagram of an investigation-range-limited tree acquired regarding the down of a CI.

The investigation range limiting unit 12 refers to the failure information DB 32 and acquires the attenuations of the relations rel16 to rel18. FIG. 29 illustrates the attenuations acquired by the investigation range limiting unit 12. In the failure information DB 32, the relation rel16 has a number of appearance of 0, an importance level of 1 and an attenuation of 6. In the failure information DB 32, the relation rel17 has a number of appearance of 4, an importance level of 5 and an attenuation of 1. In the failure information DB 32, the relation rel18 has a number of appearance of 0, an importance level of 1 and an attenuation of 6.

Since the attenuation of the relation rel16 is 6 and is lower than a hop value of 10 in the CI Tb, the investigation range limiting unit 12 follows the relation rel16 and registers the CI vb01 as a node. The subtraction of the attenuation 6 from the hop value in the CI vb01 results in 4.

Since the attenuation of the relation rel17 is 1 and is lower than a hop value of 10 in the CI Tb, the investigation range limiting unit 12 follows the relation rel17 and registers the CI vb02 as a node. The subtraction of the attenuation 1 from the hop value in the CI vb02 results in 9.

Since the attenuation of the relation rel18 is 6 and is lower than a hop value of 10 in the CI Ta, the investigation range limiting unit 12 follows the relation rel18 and registers the CI vb03 as a node. The subtraction of the attenuation 6 from the hop value in the CI vb03 results in 4.

The dependent class having the CI vb01 registered as a node is the relation rel03. The dependent class having the CI vb02 is the relation rel07. The dependent class having the CI vb03 is the relation rel11.

The investigation range limiting unit 12 refers to the failure information DB 32, and acquires the attenuations of the relations rel03, rel07, and rel11. FIG. 29 further illustrates the attenuations of the relation rel03, rel07, and rel11. In the failure information DB 32, the relation rel03 has a number of appearance of 0, an importance level of 1 and an attenuation of 6. In the failure information DB 32, the relation rel07 has a number of appearance of 2, an importance level of 3 and an attenuation of 2. In the failure information DB 32, the relation rel11 has a number of appearance of 0, an importance level of 1 and an attenuation of 6.

Since the attenuation of the relation rel03 is 6 and is equal to or higher than a hop value of 7 in the CI vb01, the investigation range limiting unit 12 stops following relations with the CI vb01.

Since the attenuation of the relation rel07 is 2 and is lower than a hop value of 9 in the CI vb02, the investigation range limiting unit 12 follows the relation rel07 and registers the CI pm12 as a node. The subtraction of the attenuation 2 from the hop value in the CI pm12 results in 7. Since no relations belonging to the dependent class has the CI pm12 as its target, the investigation range limiting unit 12 stops following relations with the CI pm12.

Since the attenuation of the relation rel11 is 6 and is equal to or higher than a hop value of 4 in the CI va03, the investigation range limiting unit 12 stops following relations with the CI vb03.

Figure 31:
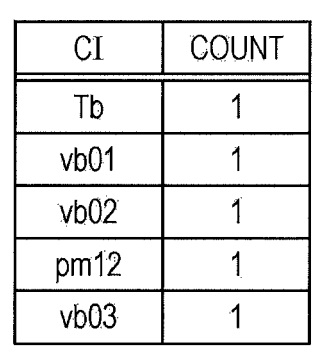

FIG. 30 is an investigation-range-limited tree acquired as a result of the down of the CI Tb. The CI Tb becomes its root, and the CIs vb01 to vb03 are connected thereto as nodes. The CI pm12 is connected to the CI vb02 as a node. Creating a number-of-appearance-of-CI count table regarding the investigation-range-limited tree, the CI Tb, CIs vb01 to vb03, and CI pm12 have a value of 1, as illustrated in FIG. 31.

Figure 32:
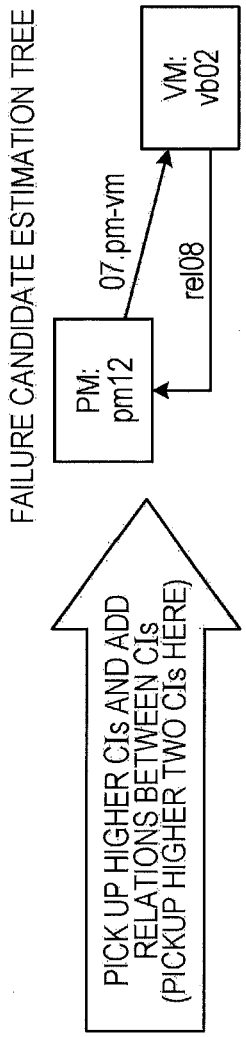
FIG. 32 is an explanatory diagram of creation of a failure position candidate estimation tree.

The failure position candidate estimating unit 13 superimposes the investigation-range-limited trees acquired regarding the CI vb02, CI Ta, and CI Tb and creates a failure position candidate estimation tree. FIG. 32 is an explanatory diagram illustrating the creation of the failure position candidate estimation tree. The failure position candidate estimating unit 13 compiles the number-of-appearance-of-CI count tables acquired regarding the CI vb02, CI Ta, and CI Tb and sorts them in decreasing order of values of the counters. The failure position candidate estimating unit 13 creates a failure position candidate tree from the higher CIs as a result of the sorting.

Referring to FIG. 32, the failure position candidate estimating unit 13 selects the higher two CIs and acquires the relations of the selected CIs from the configuration information 21 to acquire the failure position candidate estimation tree. The CIs and/or relations included in the failure position candidate estimation tree have a higher possibility of having a failure. For example, a failure occurring in the CI pm12 may cause errors in the CI vb02, CI Ta, and CI Tb, for example. In this case, even when an error is not detected in the failure position, it may be estimated with reference to the failure position candidate estimation tree that the CI pm12 has a high possibility of having a failure.

As described above, the failure position estimation apparatus 30 according to this second embodiment classifies relations between components of a system into relation classes, follows the components on the basis of the relation classes upon occurrence of an error and locates the range having the failure causing the error.

The location of a failure by using relation class in that way does not depend on the configuration of the network system and is highly generic. Thus, it is applicable to a newly constructed network system or may be applied to a network system with a changed configuration.

The disclosed art may locate a failure for trouble investigation in a large-scale network system or virtual environment and support the trouble investigation.

More specifically, the disclosed art is applicable to a virtual network having components of physical machines, virtual machines, and services. Defining the dependent class, influence class or p-c class on the basis of the relationship between the source and target of a relation and determining the direction to follow in accordance with the class allow defining error propagation independent of its actual configuration and estimating the failure position.

According to the disclosed art, relations are classified with reference to operation information of a network and on the basis of its actual operation state. This may improve the accuracy of the classification of relation classes and thus improves the accuracy of the estimation of a failure position.

Since the disclosed art sets a hop value that limits the number of components to follow, the failure position candidates may be efficiently located. According to the disclosed art, the number of components to follow is weighted with reference to histories of relations followed when an error has occurred in the past and on the basis of the relations in the histories. This may improve the accuracy of estimation of a failure position.

The method, apparatus, and program disclosed according to the embodiments are only examples, and the configurations and operations may be changed properly for implementation. For example, the apparatus disclosed according to the second embodiment may have the relation class applying unit 11, investigation range limiting unit 12, and failure position candidate estimating unit 13 distributed in a network system and may be implemented as a failure position estimation system. The CMDB and/or failure information DB may be provided such that it and/or they may be referred in the network system. The CMDB and/or failure information DB may be shared by other apparatuses or systems.

According to the second embodiment, the relations are classified into three relation class of the dependent class, influence class, and p-c class, for example. However, the number and definitions of relation classes are not limited thereto. The arbitrary number and definitions of relation classes may be set properly. In the same manner, the application rules of the relation classes, operation information to be used, and/or investigation details may be changed for implementation. The limitation of the range for creating investigation-range-limited trees with hop values and attenuations may be changed properly. For example, the hop values may be changed to determine the upper limit of the number of components to follow.

The processes on the flowcharts disclosed according to the second embodiment may be added and/or deleted, or the order of the processes may be changed.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments of the present invention have been described in detail, it should be understood that the various changes, substitutions, and alterations could be made hereto without departing from the spirit and scope of the invention.

What is claimed is:

1. An apparatus for selecting a candidate for a failure component causing errors from a plurality of components included in a network system, the apparatus comprising:
a processor configured to execute a process, the process including:
determining a relation class of a relation among the plurality of components on the basis of configuration information of the network system, each of the relations being classified into one of the relation classes in accordance with a direction of an error propagation;
determining an investigation range for each component having an error on the basis of investigation information including an error type of an error occurred in the each component and an investigation direction corresponding to the relation class, the investigation range being a set of the components to be investigated; and
selecting a component on the basis of an appearance frequency of each component in the investigation ranges as the candidate for the failure component, wherein
the determining the relation class includes determining the relation class of the relation between a pair of a source component and a target component, the source component and the target component being included in the plurality of components, and
the relation classes include at least one of a depended class, an influenced class and a used class, the source component in the relation of the depended class causing an operation stop of the target component in the relation of the depended class, the source component in the relation of the influenced class causing a performance error of the target component in the relation of the influenced class, the target component in the relation of the used class using the source component in the relation of the used class.

2. The apparatus according to claim 1, wherein the network system is a virtual system, each of the plurality of components being a physical machine, a virtual machine or a service.

3. The apparatus according to claim 1, wherein the determining the investigation range includes
determining that the investigation direction of the depended class is directed from the target component to the source component in case that the type of the error relates to the operation stop,
determining that the investigation direction of the influenced class is directed from the target component to the source component in case that the type of the error relates to the performance error, and
determining that, in case that the type of the error relates to a delay error, the investigation direction of the used class is directed from the target component to the source component and the investigation direction of the influenced class is directed from the source component to the target component.

4. The apparatus according to claim 1, wherein the at least one relation includes two relations between two components in the plurality of components.

5. An apparatus for selecting a candidate for a failure component causing errors from a plurality of components included in a network system, the apparatus comprising:
a processor configured to execute a process, the process including:
determining a relation class of a relation among the plurality of components on the basis of configuration information of the network system, each of the relations being classified into one of the relation classes in accordance with a direction of an error propagation;
determining an investigation range for each component having an error on the basis of investigation information including an error type of an error occurred in the each component and an investigation direction corresponding to the relation class, the investigation range being a set of the components to be investigated; and
selecting a component on the basis of an appearance frequency of each component in the investigation ranges as the candidate for the failure component,
wherein the investigation information includes a predetermined value for limiting an investigation number of the plurality of components investigated in the investigation range, and
wherein the process includes weighing the investigation number on the basis of a history of previous investigations.

* * * * *